(12) United States Patent
Henry et al.

(10) Patent No.: US 7,652,840 B2
(45) Date of Patent: Jan. 26, 2010

(54) HEAD DAMAGE DETECTION BASED ON ACTUATION EFFICIENCY MEASUREMENTS

(75) Inventors: Barry Henry, Shrewsbury, MA (US); Jim Fitzpatrick, Sudbury, MA (US); Jesse Speckhard, Douglas, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 322 days.

(21) Appl. No.: 11/745,691

(22) Filed: May 8, 2007

(65) Prior Publication Data

US 2007/0268614 A1 Nov. 22, 2007

Related U.S. Application Data

(60) Provisional application No. 60/747,643, filed on May 18, 2006.

(51) Int. Cl.
*G11B 21/02* (2006.01)

(52) U.S. Cl. ............................................. 360/75

(58) Field of Classification Search .................. 360/69, 360/75, 78.12, 234.3, 246.6; 228/25; 356/600; 29/603.1; 219/655
See application file for complete search history.

(56) References Cited

U.S. PATENT DOCUMENTS

| 3,229,883 | A | * | 1/1966 | Yost .............................. 228/25 |
| 5,390,059 | A | * | 2/1995 | Tokuyama et al. ......... 360/246.6 |
| 6,075,604 | A | * | 6/2000 | Crawforth et al. ............ 356/600 |
| 6,108,170 | A | * | 8/2000 | Crawforth et al. ......... 360/234.3 |
| 6,321,440 | B1 | * | 11/2001 | Crawforth et al. ........... 29/603.1 |
| 2008/0023468 | A1 | * | 1/2008 | Aoki et al. ................... 219/655 |

* cited by examiner

*Primary Examiner*—Fred Tzeng
(74) *Attorney, Agent, or Firm*—Westman, Champlin & Kelly, P.A.

(57) ABSTRACT

An actuation efficiency for a head is determined based on a displacement of the head relative to a storage media responsive to excitation of a heater element. Damage to the head is detected based on the determined actuation efficiency. Related circuits and devices are also discussed.

20 Claims, 4 Drawing Sheets

HEAD DAMAGE DETECTION BASED ON ACTUATION EFFICIENCY MEASUREMENTS

RELATED APPLICATION

This application claims the benefit of and priority to U.S. Provisional Patent Application No. 60/747,643, filed May 18, 2006, the disclosure of which is hereby incorporated herein by reference as if set forth in its entirety.

FIELD

The present invention generally relates to head control, and, more particularly, to detecting head damage.

BACKGROUND

Disk drives are digital data storage devices that may allow host computers to store and retrieve large amounts of data in a fast and efficient manner. A typical disk drive may include a plurality of magnetic recording disks, which may be mounted to a rotatable hub of a spindle motor and rotated at a high speed. An array of read/write heads may be disposed adjacent to data storage surfaces of the disks to transfer data between the disks and a host computer. The heads can be radially positioned over the disks by a rotary actuator and a closed loop servo system, and can fly in close proximity to the surfaces of the disks upon air bearings. The heads each typically contain a separate read element and write element.

Higher data storage density on the disks may be obtained by reading and writing data on narrower tracks on the disks, and/or by maintaining narrower flying height gaps between the heads and the data storage surfaces. The flying height of a head can vary in response to air density changes in the disk drive and/or in response to head temperature variations that can affect the distance that the tip of the head protrudes therefrom (i.e., pole tip protrusion). Accordingly, some disk drives may controllably heat the head using a heater element to vary the flying height of the head. More particularly, dynamically controlled fly height or Fly Height Adjust (FHA) may be achieved using an actuation coil built into the head. When power is applied to the coil, the head may protrude towards the disk. As such, by adjusting the power applied to the heater element, a fly height/spacing between the head and the disk surface can be maintained in a variety of changing environmental conditions, for example, due to changes in temperature, barometric pressure, etc.

Maintaining the head flying height within a desired or acceptable range may become increasingly more difficult as that range is reduced to obtain higher data storage densities. Operation outside the acceptable range may result in an unacceptable read/write bit error rate and/or undesirable contact between a head and a data storage surface and potential loss of data and/or damage to the data storage surface. For example, in cases where a head inadvertently contacts the disk during normal drive operation, burnishing or degrading of a protective overcoat on an air bearing surface of the head may result. The loss of the overcoat may result in increased susceptibility to corrosion and/or shortening of the head life. Also, as the head's air bearing surface may be used to build pressure to lift the head from the disk surface during normal drive operation, burnishing of the air bearing surface may alter the spacing between the head and the disk surface and/or may result in a "softer" air bearing.

SUMMARY

According to some embodiments, an actuation efficiency for a head is determined based on a displacement of the head relative to a storage media responsive to excitation of a heater element. Damage to the head is detected based on the determined actuation efficiency.

According to other embodiments, a method includes determining an actuation efficiency for a head based on a displacement of the head relative to a storage media responsive to excitation of a heater element. Damage to the head is detected based on the determined actuation efficiency.

According to further embodiments, a circuit includes a controller that determines an actuation efficiency for a head based on a displacement of the head relative to a storage media responsive to excitation of a heater element. The circuit detects damage to the head based on the determined actuation efficiency.

According to still further embodiments, a disk drive includes a rotatable data storage disk, a head that is adjacent to the rotatable storage disk, and a controller. The controller determines an actuation efficiency for the head based on a displacement of the head toward a surface of the disk adjacent thereto responsive to excitation of a heater element. The controller detects damage to the head based on the determined actuation efficiency.

DETAILED DESCRIPTION

Figure 1:
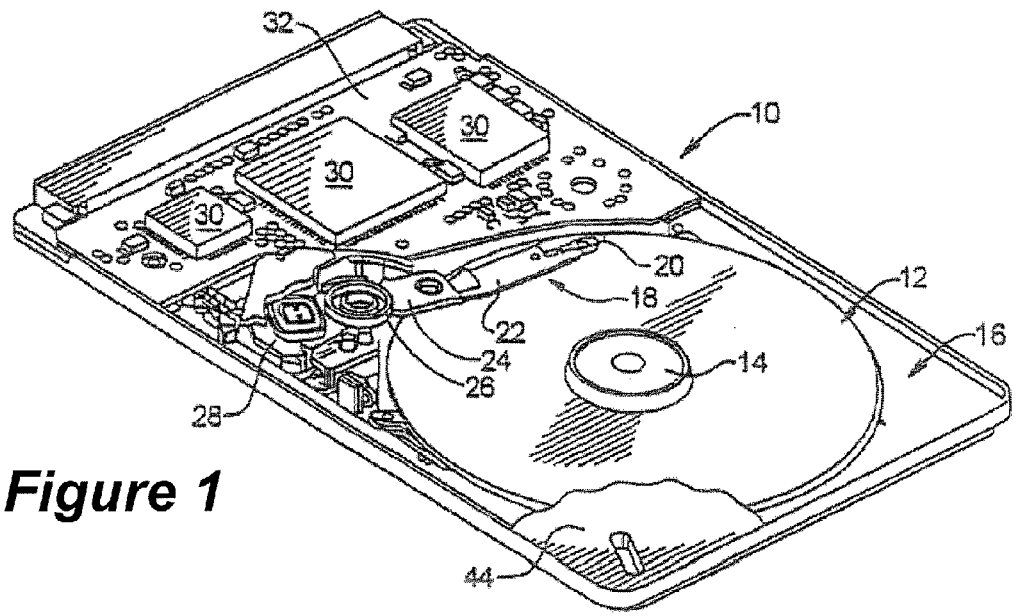
FIG. 1 is a perspective view of a disk drive with electronic circuits in accordance with some embodiments.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will convey the scope of the invention to those skilled in the art. The terminology used in the detailed description of the particular exemplary embodiments illustrated in the accompanying drawings is not intended to be limiting of the invention.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various steps, elements and/or regions, these steps, elements and/or regions should not be limited by these terms. These terms are only used to distinguish one step/element/region from another step/element/region. Thus, a first step/element/region discussed below could be termed a second step/element/region without departing from the teachings. Like numbers refer to like elements throughout the description of the figures.

The present invention may be embodied in hardware and/or in software (including firmware, resident software, microcode, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show what may be a primary direction of communication, it is to be understood that communication may occur in the opposite direction to the depicted arrows.

Some embodiments of the present invention provide methods and devices for detecting head damage based on the actuation efficiency of the head. As used herein, "actuation efficiency" may refer to the amount of movement or displacement of the head relative to the disk surface per amount of power applied to a corresponding heater element for the head. More particularly, the actuation efficiency of the head may be monitored during drive operation, and changes in the air bearing and/or other flying characteristics of the head may be detected based on changes in the actuation efficiency. The changes in the air bearing and/or other flying characteristics of the head may indicate head damage, such as burnishing of the head's air bearing surface (ABS). For example, the changes in spacing and/or stiffness of the air bearing of a burnished head may result in a different amount of movement towards the disk surface responsive to excitation of the heater element as compared to an unburnished head. Accordingly, head burnishing may be detected without the need to force contact between the head and the disk surface, which may cause increased friction and/or wear.

Figure 2:
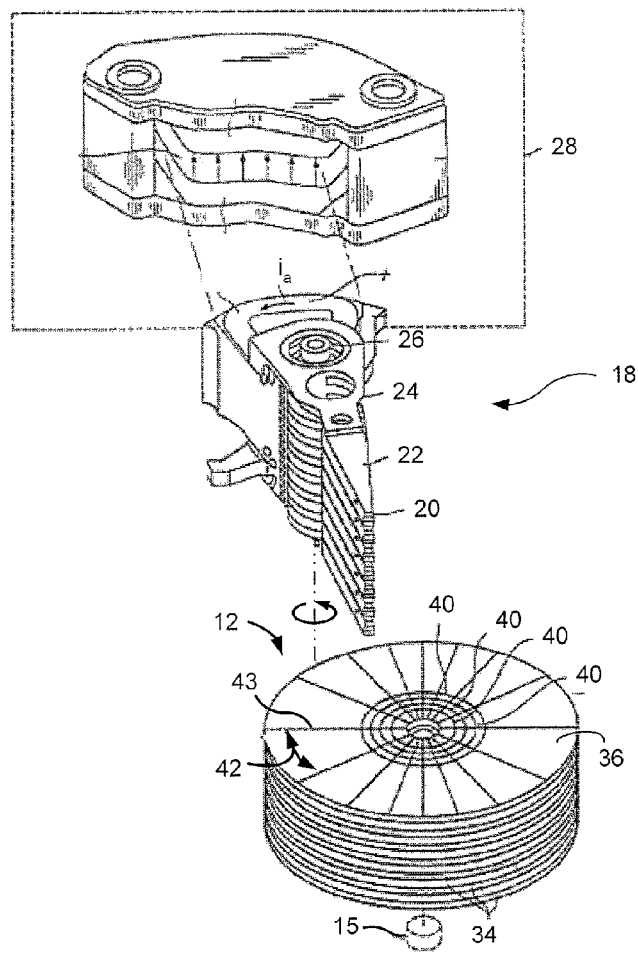
FIG. 2 is a diagram of an exemplary head disk assembly of the disk drive.

A simplified diagrammatic representation of a disk drive, generally designated as 10, is illustrated in FIG. 1. The disk drive 10 includes a disk stack 12 (illustrated as a single disk in FIG. 1) that is rotated about a hub 14 by a spindle motor 15 (FIG. 2). The spindle motor 15 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The actuator arm assembly 18 includes a read/write head 20 (or transducer) mounted to a flexure arm 22 which is attached to an actuator arm 24 that can rotate about a pivot bearing assembly 26. The read/write head, or simply head, 20 may, for example, include a magnetoresistive (MR) element and/or a thin film inductive (TFI) element. The actuator arm assembly 18 also includes a voice coil motor (VCM) 28 which radially moves the head 20 across the disk stack 12. The spindle motor 15 and actuator arm assembly 18 are coupled to a controller, read/write channel circuits, and other associated electronic circuits 30 which are configured in accordance with at least one embodiment, and which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 15.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 across their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks 40 and spokes 43 on the disks 34. Data is stored on the disks 34 within a number of concentric tracks 40 (or cylinders). Each track 40 is divided into a plurality of radially extending sectors 42 separated by radially extending spokes 43. Each sector is further divided into a servo sector and a data sector. The servo sectors of the disks 34 are used, among other things, to accurately position the head 20 so that data can be properly written onto and read from a selected one of the disks 34. The servo sectors may include a DC erase field, a preamble field, a servo address mark field, a track number field, a spoke number field, and a servo burst field (e.g., circumferentially staggered and radially offset A, B, C, D servo bursts). The data sectors are where data received as part of a host-initiated write command is stored, and where data can be read in response to a host-initiated read command. In addition, one or more of the tracks 40 may include a specific bit pattern that may be used for measuring spacing between the head and the disk surface. For example, the bit pattern may be a periodic bit pattern written on a dedicated track used for detecting changes in spacing between the head and the disk surface. In some embodiments, the bit pattern may be written on one or more of the tracks 40 during a manufacturing process and/or during factory testing of the disk drive 10.

Figure 3:
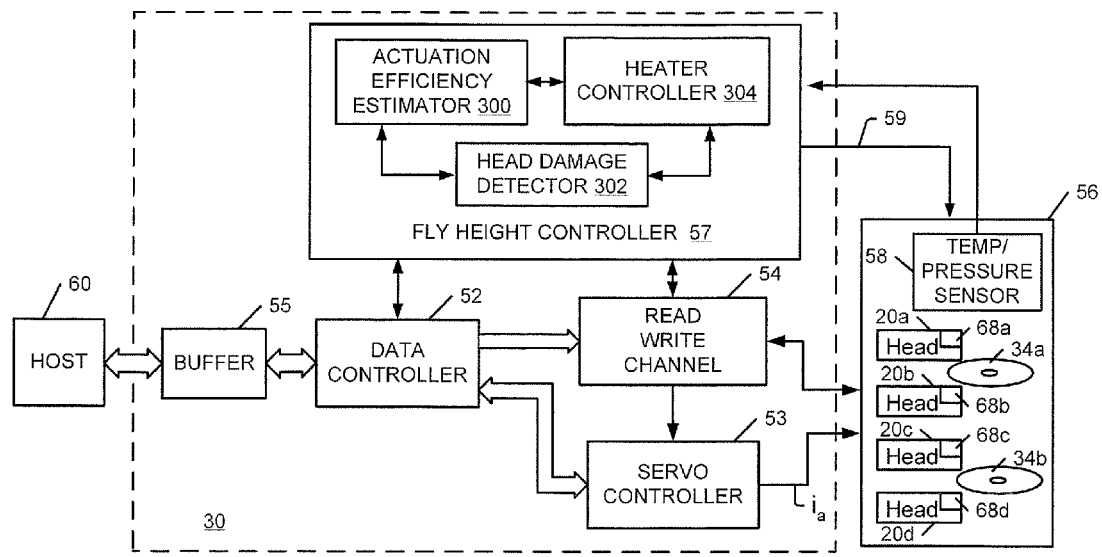
FIG. 3 is a block diagram of a portion of the controller of the disk drive shown in FIG. 1 and associated methods that are configured in accordance with some embodiments.

FIG. 3 is a block diagram of a host device 60 that is communicatively connected to a portion of the controller 30 of the disk drive 10 shown in FIG. 1 according to some embodiments. The controller 30 can include a data controller 52, a servo controller 53, a read write channel 54, a buffer 55, and a fly height controller 57. Although the controllers 52, 53, and 57, the buffer 55, and the read write channel 54 have been shown as separate blocks for purposes of illustration and discussion, it is to be understood that their functionality described herein may be integrated within a common integrated circuit package or distributed among more than one integrated circuit package. The head disk assembly (HDA) 56 can include a plurality of the disks 34a-b, a plurality of the heads 20a-d mounted to the actuator arm assembly 18 and positioned adjacent to different data storage surfaces of the disks 34a-b, the VCM 28, and the spindle motor 15. In general, there may be two heads 20 per disk 34. Thus, in a 4-disk platter drive, there may be eight heads 20. The HDA 56 may also include a temperature/pressure sensor 58 used to measure the air temperature and/or air pressure during reading and/or writing operations of the disk drive 10.

Write commands and associated data from the host device 60 are buffered in the buffer 55. The data controller 52 is configured to carry out buffered write commands by formatting the associated data into blocks with the appropriate header information, and transferring the formatted data from the buffer 55, via the read/write channel 54, to logical block addresses (LBAs) on the disk 34 identified by the associated write command.

The read write channel 54 can operate in a conventional manner to convert data between the digital form used by the data controller 52 and the analog form of a write current conducted through a selected head 20 in the HDA 56. The read write channel 54 provides servo positional information read from the HDA 56 to the servo controller 53. The servo positional information can be used to detect the location of the head 20 in relation to LBAs on the disk 34. The servo controller 53 can use LBAs from the data controller 52 and the servo positional information to seek the head 20 to an addressed track and block on the disk 34, and to maintain the head 20 aligned with the track while data is written/read on the disk 34.

When a head 20 is selected for reading/writing, its fly height is typically above an acceptable flight height range where the head 20 should be located when reading/writing data on the disk 34. Accordingly, in response to selection of a head 20, the fly height controller 57 heats the head 20 using a heater element, such as an actuation coil, to lower the head fly height to within the acceptable range. Upon reaching the acceptable range, reading/writing may be carried out through the selected head 20 while regulating heating by the heater element to attempt to maintain the fly height within the acceptable range.

In accordance with some embodiments, the fly height controller 57 includes an actuation efficiency estimator 300, a head damage detector 302, and a heater controller 304. The heater controller 304 controls heating of the head 20 by a heater element 68. The actuation efficiency estimator 300 determines an actuation efficiency for the head 20 based on a displacement of the head 20 toward a surface of the disk 34 responsive to actuation/excitation thereof, for example, as data is written/read from the disk 34. As used herein, the actuation efficiency of the head 20 refers to the movement or displacement of the head 20 (for example, as measured in nanometers) responsive to the power (for example, as measured in milliwatts) applied to the heater element 68. The movement or displacement of the head may be measured indirectly in a non-contact manner, for example, based on changes in a read signal. The head damage detector 302 detects damage to the head 20 based on the actuation efficiency determined by the actuation efficiency estimator 300. The actuation efficiency estimator 300 and/or the head damage detector 302 may regulate head heating by the heater controller 304 based on the determined actuation efficiency and/or the detected head damage to drive the head 20 to within an acceptable fly height range and attempt to maintain the head fly height within that range.

The heater controller 304 controls head fly height by regulating the power that is provided to a heater element, such as an actuation coil, that heats a selected head. With reference to FIG. 3, the HDA 56 may include a plurality of heater elements 68a-d attached, or otherwise thermally connected, to respective ones of the heads 20a-d. The heater controller 304 generates a height adjustment signal 59 which is conducted through the heater elements 68a-d to generate heat therefrom and, thereby, heat the heads 20a-d. The heater controller 304 regulates the height adjustment signal 59 to individually control heating of the heads 20a-d and cause a desired movement or displacement of the heads 20a-d towards the respective surfaces of the disks 34a-b, and thereby separately control fly heights of the heads 20a-d. Although a single height adjustment signal 59 from the heater controller 304 is illustrated in FIG. 3, it is to be understood that additional height adjustment signals 59 may be used to separately control heating by the respective heater elements 68a-d and that, for example, the heater elements 68a-d may be controlled by individual height adjustment signals 59.

The actuation efficiency estimator 300 determines actuation efficiencies for one or more of the heads 20a-d based on respective amounts of movement of the heads 20a-d relative to the corresponding adjacent surfaces of the disks 34a-b responsive to application of power to the corresponding heater element(s) 68a-d via the heater controller 304. For example, the servo controller 53 may position a selected head 20a on a particular track on the disk 34a that includes a specific bit pattern, such as a periodic bit pattern that may be used for measuring spacing between the head 20a and the disk surface. The actuation efficiency estimator 300 may thereby use the bit pattern on the track to measure the amount of displacement of the head responsive to a predetermined amount of power provided via the height adjustment signal 59 to calculate the actuation efficiency. More particularly, based on changes in a read signal from the track, the actuation efficiency estimator 300 may approximate an amount of displacement of the head 20a toward the surface of the disk 34a relative to the distance between the head 20a and the surface of the disk 34a at a zero-power state, for example, about 10 nanometers (nm). In addition or alternatively, the actuation efficiency estimator 300 may measure relative changes in fly height or spacing between the head 20a and the surface of the disk 34a responsive to the applied power to determine the actuation efficiency.

The head damage detector 302 detects damage to one or more of the heads 20a-d based on the corresponding actuation efficiency determined by the actuation efficiency estimator 300. More particularly, based on the determined actuation efficiency for the head 20a, the head damage detector 302 may detect changes in the air bearing and/or other flying characteristics of the head 20a. For example, burnishing of the air bearing surface (ABS) of the head 20a may affect how the air bearing surface builds air pressure to push the head 20a away from the surface of the disk 34. As such, changes in the fly height or spacing between the head 20a and the disk 34 may be used as an indicator of damage to the head 20a.

More particularly, the head damage detector 302 may detect such head damage based on a comparison of the determined actuation efficiency relative to an expected actuation efficiency for the head 20a, which may be defined relative to similar actuation power levels and environmental conditions, such as air temperature and/or pressure. For example, the head damage detector 302 may determine the expected actuation efficiency for the head 20a based on measurements of head displacement responsive to a range of applied power and/or over a range of operational air temperatures. The expected (baseline) measurements may be performed by the actuation efficiency estimator 300, for example, during a manufacturing or testing process, and may be stored as a table in a memory of the fly height controller 57.

The actuation efficiency estimator 300 may determine a present actuation efficiency for the head 20a by detecting an amount of head displacement responsive to application of a predetermined amount of power by the heater controller 304. The temperature/pressure sensor 58 may also measure an air temperature corresponding to the determined actuation efficiency. The head damage detector 302 may determine an expected actuation efficiency for the head 20a responsive to a substantially similar amount of power and/or at a substantially similar temperature based on the baseline efficiency measurement data stored in the table. The head damage detector 302 may thereby detect damage to the head 20a based on differences between the determined actuation efficiency and the expected actuation efficiency. For example, the head damage detector 302 may detect damage to the head 20a if the difference between the determined actuation efficiency and the expected actuation efficiency exceeds a predetermined threshold. The threshold may vary based on and/or account for changes in environmental conditions such as temperature and/or pressure, and/or other factors that may affect measurement repeatability.

In some embodiments, upon detecting damage to the head 20a, the head damage detector 302 may flag the event or further characterize the head damage by storing head damage data corresponding to the detected damage, for example, in the memory of the fly height controller 57. In addition, the head damage detector 302 may dynamically regulate the heater controller 304 to modify an amount of power applied to the heater element 68a of the head 20a to adjust the fly height of the head 20a relative to the surface of the disk 34a to attempt to compensate for the detected changes in the air bearing and/or other flying characteristics of the head 20a.

It is to be understood that, although various embodiments have been described herein with reference to the head 20a, the operations discussed above with reference to FIG. 3 may be similarly performed for one or more of the other heads 20b-d. Moreover, measurements and/or other determined information for one or more of the heads 20a-d may be shared for use in detecting head damage among all of the heads 20a-d. For example, as changes in altitude may affect the respective actuation efficiencies of the heads 20a-d, the head damage detector 302 may infer a change in altitude based on similar determined actuation efficiencies and/or amounts of displacement for multiple heads 20a-d. Accordingly, changes in environmental conditions, which may affect the thresholds for head damage detection, may be inferred based on detection of similar responses by multiple ones of the heads 20a-d.

Figure 4:
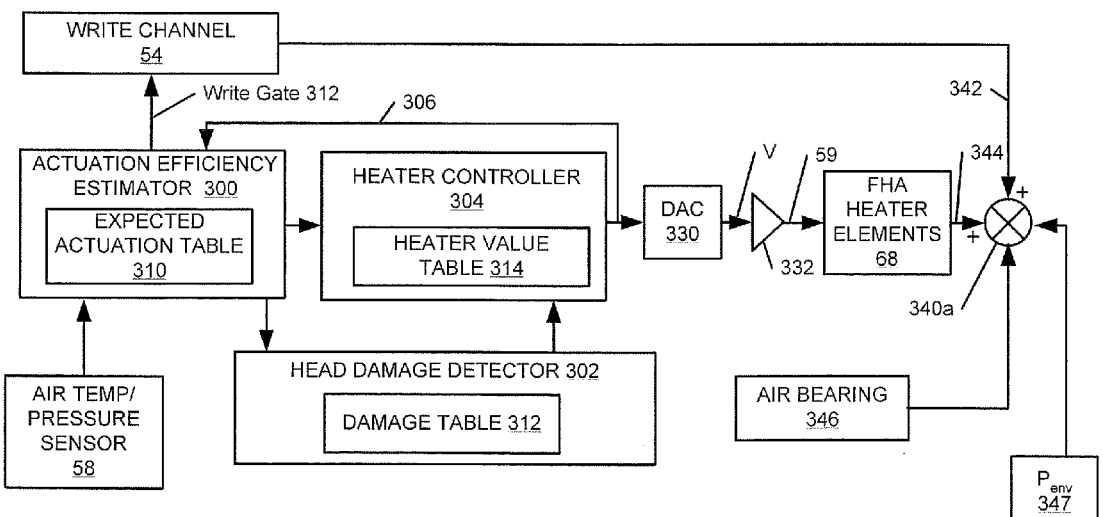
FIG. 4 is more detailed block diagram of the fly height controller of FIG. 3 and associated methods that are configured in accordance with some embodiments.

FIG. 4 is a more detailed block diagram of the fly height controller 57 of FIG. 3 in accordance with some embodiments. As shown in FIG. 4, although changes in the air bearing and/or other flying characteristics of the heads 20a-d may be indicators of head damage, the displacement or fly height of a selected head may depend not only on the heat output 344 of the heater elements 68, but may also depend upon the cumulative effects (illustrated at summing node 340a) of parameters which are not controlled by the fly height controller 57, including environmental conditions 347, such as air temperature and/or air pressure, and the configuration of a slider portion of the selected head which generates the air bearing 346.

Accordingly, as illustrated in FIG. 4, the actuation efficiency estimator 300 can include an expected actuation table 310 that includes baseline expected values that may have been measured or otherwise defined for each of the heads 20a-d. As such, the actuation table 310 may be used to calculate the expected actuation efficiencies for each of the heads 20a-d. For example, the values stored in the table 310 may indicate the respective amounts of expected displacement for each of the heads 20a-d responsive to a range of power applied to corresponding ones of the heater elements 68a-d and over a range of air temperatures, air pressures, and/or reading and/or writing conditions, such as for write operations of differing lengths and/or duty cycles.

The values of the expected actuation table 310 may be determined during the design of the disk drive 10, during factory testing, and/or during initial formatting of the disk drive 10 by a customer. For example, respective amounts of displacement for each of the heads 20a-d may be individually measured by positioning each head on a predetermined track of a corresponding disk and reading a particular bit pattern encoded on the track while the heater elements are supplied with a range of power levels and the disk drive 10 is subjected to a range of operating temperatures. The movement of each head toward the surface of the disk may be repeatedly measured based on the read signal from the track under the above conditions, and the repeated measurements may be stored in the table 310. For example, the measurements may indicate the amount of movement, in nanometers, for each head toward the disk surface relative to the distance between the head and the disk surface at a zero-power or unexcited state (for example, about 10 nm).

Accordingly, the actuation efficiency estimator 300 may use the values in the table 310 to calculate the expected actuation efficiencies for one or more of the heads 20a-d that correspond to a level of applied power and/or a present air temperature, such as that measured by the temperature/pressure sensor 58. In addition, the values stored in the table 310 may be used to estimate the expected actuation efficiencies for one or more of the heads 20a-d over a range of temperatures by extrapolating head displacement values at different temperatures based on the measured amounts of displacement for at least two temperatures. Thus, the actuation efficiency estimator 300 may calculate a relationship between head displacement, applied power, and/or disk drive operating temperature for the heads 20a-d based on the measurements stored in the table 310 to determine the expected actuation efficiencies for the heads 20a-d over a range of power and/or temperatures.

The actuation efficiency estimator 300 may also determine the present actuation efficiency of one or more of the heads 20a-d by measuring the fly height and/or displacement of a respective head responsive to application of a predetermined amount of power via the heater controller 304. For example, the actuation efficiency estimator 300 may determine the present actuation efficiency for the head 20a by positioning the head 20a on a predetermined track having a periodic bit pattern, and measuring the displacement of the head 20a based on changes in a magnitude of the read signal. More particularly, the actuation efficiency estimator 300 may determine the magnitudes of one or more harmonic frequency components of a read signal generated based on the periodic bit pattern. As head displacement may have a differing effect on the magnitudes of the different harmonic frequency components, the relative change in magnitude between two or more harmonic frequency components of the read signal may indicate changes in displacement of the head 20a. Accordingly, the actuation efficiency estimator 300 may compare the relative magnitudes of the harmonic components to effectively determine the relative displacement of the head 20a. Other well-known methods, such as changes in bit error rates, may also be used to indirectly measure the displacement of the head 20a. The actuation efficiency estimator 300 may further characterize the determined actuation efficiency based on a present disk drive operating temperature measured via the temperature/pressure sensor 58. The actuation efficiency estimator 300 may determine the present actuation efficiency of the head 20a periodically, intermittently, at predetermined times, responsive to detecting changes in environmental conditions (such as changes in temperature and/or pressure), and/or responsive to detecting a read and/or write error rate that is greater than a predetermined threshold.

The head damage detector 302 may detect head damage by comparing the present actuation efficiency determined by the actuation efficiency estimator 300 for a selected head to an expected actuation efficiency for the same head, as may be determined based on the actuation table 310. For example, the actuation efficiency estimator 300 may estimate the expected actuation efficiency for the head 20a at a substantially similar applied power and a substantially similar disk drive operating temperature as that of the present actuation efficiency for the head 20a based on the measured values stored in the table 310 for the head 20a. More particularly, based on the values stored in the table 310, the actuation efficiency estimator 300 may determine the amount of expected displacement of the head 20a toward the surface of the disk 34a at the power and operating temperature corresponding to the determined actuation efficiency for the head 20a, and may calculate the expected actuation efficiency for the head 20a by dividing the amount of displacement by the applied power.

The head damage detector 302 may determine if head damage is present based on the comparison between the expected and determined actuation efficiencies for the head 20a. More particularly, the head damage detector 302 may detect changes in the air bearing and/or other flying characteristics of the head 20a when a difference between the determined actuation efficiency received from the actuation efficiency estimator 300 and the expected actuation efficiency calculated from the actuation table 310 exceeds a predetermined threshold. For example, the head damage detector 302 may detect burnishing of the air bearing surface of the head 20a when the difference between the expected and determined actuation efficiencies is greater than about 10%. Upon detecting damage to one or more of the heads 20a-20d, the head damage detector 302 may store corresponding head damage data in a table 312.

Still referring to FIG. 4, the heater controller 304 can include a heater value table 314 that correlates head displacement and/or fly height into digital heater values 306. The digital heater values 306 are converted by a digital-to-analog converter (DAC) 330 into an analog voltage that is amplified by an amplifier 332 to generate a height adjustment signal 59 that may be selectively conducted to one of the fly height adjust (FHA) heater elements 68a-d for a selected one of the heads 20a-d. As such, in some embodiments, the head damage detector 302 may dynamically update the heater value table 314 based on the determined actuation efficiency and/or head damage to modify the height adjustment signal 59, and thus, dynamically adjust the power supplied to the heater elements 68. The head damage detector 302 may thereby adjust the fly height of the corresponding one(s) of the heads 20a-d relative to the disk surface in an attempt to compensate for the detected changes in the air bearing and/or other flying characteristics of one or more of the heads 20a-d.

Accordingly, the actuation efficiency estimator 300 may determine an actuation efficiency for one or more of the heads 20a-d based on the present air temperature and the applied power to the corresponding heater elements 68a-d. The head damage detector 302 may thereby detect head damage by comparing the determined actuation efficiency for a selected head to an expected actuation efficiency for the same head at a substantially similar air temperature and applied power based on the values stored in the actuation table 310. In addition, in some embodiments, the head damage detector 302 may use the detected head damage data to dynamically regulate heating by the heater controller 304 to attempt to maintain the fly height of a damaged head within a desired and/or acceptable range. The head damage detector 302 may also selectively inhibit writing by the write channel 54 (via a write gate signal 312) when the fly height is outside the acceptable range.

Figure 5:
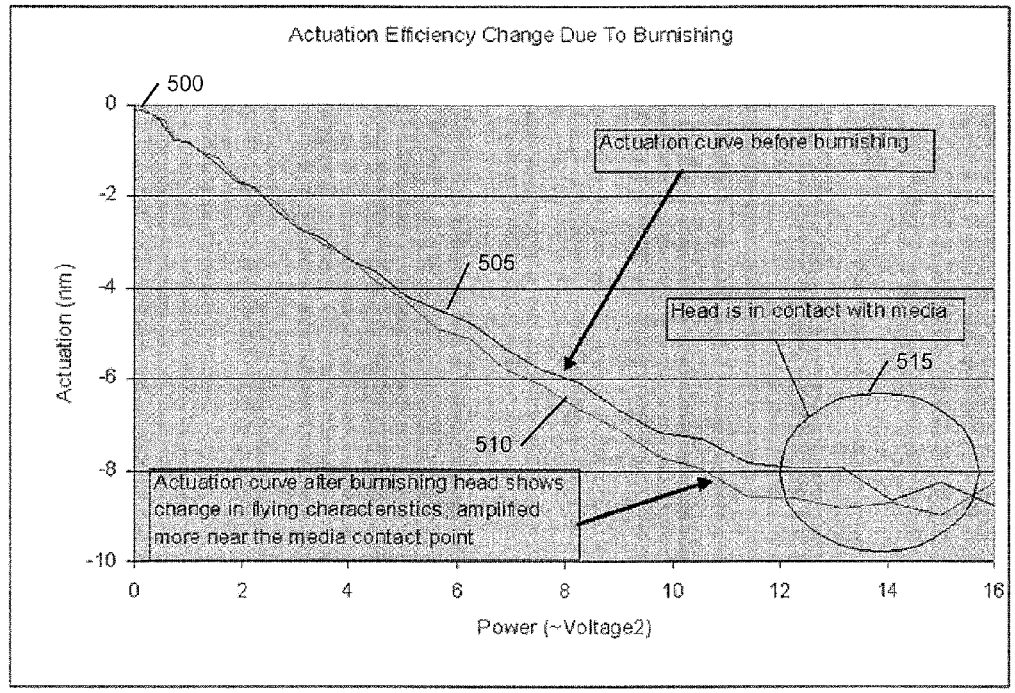
FIG. 5 is a graph illustrating changes in actuation efficiency due to head damage in accordance with some embodiments.

FIG. 5 is a graph illustrating changes in actuation efficiency due to burnishing of a head according to some embodiments. As shown in FIG. 5, an expected actuation curve 505 illustrates the expected displacement (nm) of a head from a zero-power state 500 responsive to application of power ($V^2$) to a corresponding heating element at a predetermined temperature. The zero-power state 500 may correspond to a fly height of about 10 nm above the point where contact 515 with the disk surface may result. For example, the expected actuation curve 505 may be calculated based on repeated measurements of head displacement over the range of applied power at the particular disk drive operating temperature, for example, as stored in the actuation table 310 of FIG. 4. The measurements of expected head displacement may be performed, for example, during manufacturing and/or factory testing of the disk drive 10. Expected actuation curves corresponding to different disk drive operating temperatures and/or different heads may be similarly calculated based on corresponding expected displacement measurements.

A determined actuation curve 510 similarly illustrates the displacement (nm) of the head from a zero-power state responsive to application of power ($V^2$) to a corresponding heating element at the same or substantially similar temperature. In some embodiments, the actuation curve 510 and/or the expected actuation curve 505 may be determined by positioning the head on a predetermined track on the surface of the disk. The track may include a periodic and/or other specialized bit pattern that may be used to measure the spacing between the head 20 and the disk surface. More particularly, data may be read from the predetermined track responsive to an applied amount of power, and the amount of displacement of the head relative to the zero-power state 500 may be measured based on changes in the read signal. For example, the amplitudes of the first and second harmonic components of the read signal may be measured, and the relative amplitudes may be compared to determine the amount of displacement of the head 20.

Accordingly, as shown in FIG. 5, a comparison between the determined actuation curve 510 and the expected actuation curve 505 may be used to detect damage to the selected head. More particularly, the differences in displacement of the head responsive application of a same or substantially similar amount of power may indicate changes in the air bearing and/or other flying characteristics of the head. For example, as shown in FIG. 5, at an applied power of about $11V^2$, the displacement of the head (as determined from the actuation curve 510) is about 8.2 nm, as compared to an expected displacement (as determined from the expected actuation curve 505) of about 7.5 nm. As such, the difference in displacement indicates an increased actuation of about 10%. This increased actuation of the head 20 responsive to the same amount of power may indicate a "softer" air bearing that exerts a reduced push force on the head, for example, due to burnishing of the head's air bearing surface. The difference in displacement between the expected actuation curve 505 and the determined actuation curve 510 may also be used to adjust the amount of power applied to the corresponding heater element for the head to attempt to compensate for the effects of the burnishing of the air bearing surface.

Figure 6:
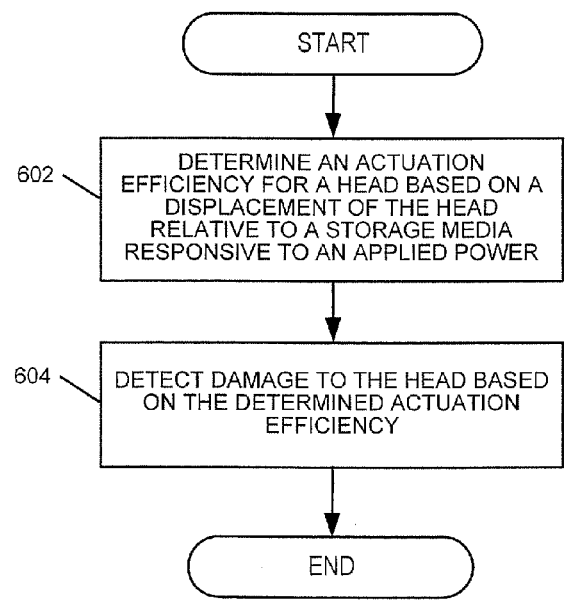
FIGS. 6 and 7 are flowcharts that illustrate operations for detecting head damage in accordance with some embodiments.

FIG. 6 is a flowchart illustrating operations for detecting head damage according to some embodiments. Referring now to FIG. 6, an actuation efficiency for a head is determined (at Block 602) based on an amount of displacement of the head relative to a storage media responsive to an amount of power applied to a heater element for the head. The actuation efficiency for the head may be determined periodically, intermittently, at predetermined times, and/or responsive to detecting a read and/or write error rate that is greater than a predetermined threshold.

Still referring to FIG. 6, based on the determined actuation efficiency, damage to the head is detected (at Block 604). For example, damage to the head may be detected based on a comparison of the determined actuation efficiency to an expected actuation efficiency for the head at a substantially similar applied power and disk drive operating temperature. More particularly, changes in an air bearing and/or other flying characteristics of the head may be detected when a difference between the determined actuation efficiency and the expected actuation efficiency exceeds a predetermined threshold. For example, the threshold may account for environmental conditions, such as temperature and/or pressure, and/or other factors that may affect measurement repeatability. The changes in the air bearing and/or other flying characteristics may indicate burnishing of the head's air bearing surface. The detected head damage may be stored as head damage data, for example, in a table, and/or may be used to dynamically modify the amount of power applied to the corresponding heater element to adjust the fly height of the head relative to the surface of the disk to somewhat compensate for the detected changes in flying characteristics.

Figure 7:
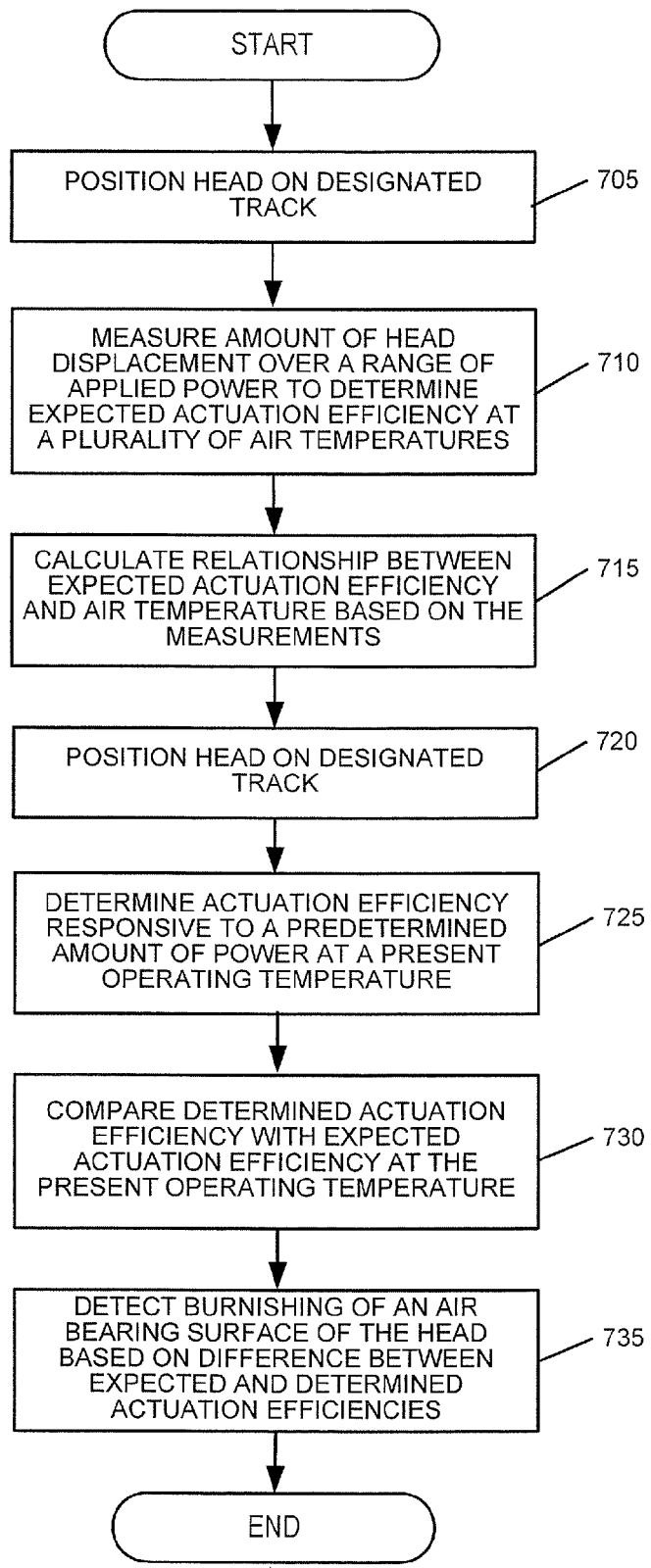

FIG. 7 is a flowchart illustrating operations for detecting head damage in greater detail. Referring now to FIG. 7, a head is positioned on a track of a disk (at Block 705). The track includes a special bit pattern, such as a periodic bit pattern that may be used for measuring actuation efficiency. For example, during the manufacturing test process, the periodic bit pattern may be written on a track on the disk that is designated for use in measuring actuation efficiency. Accordingly, the amount of actuation of the head per milliwatt of power applied to the heater element is measured to determine an expected actuation efficiency for the head (at Block 710). More particularly, the amount of displacement of the head (in nm) may be detected in a non-contact manner based on changes in a signal read from the designated track over a range of applied power. The head may be actuated from a zero power state (e.g., corresponding to about 10 nm from the disk surface), to a relatively close distance from the disk surface (e.g., about 2 nm). This process is repeated at different temperatures, for example, as the drive is warmed and cooled during manufacturing process. A relationship between expected actuation efficiency and disk drive operating temperature at the applied power level is calculated based on the repeated measurements (at Block 715). For example, the amount of displacement of the head may be measured for several specific air temperatures, and the relationship between the expected actuation efficiency and the temperature may be extrapolated for a range of temperatures based on the measurements.

Still referring to FIG. 7, during normal operation of the drive, the head is again positioned on the dedicated track (at Block 720) and the actuation efficiency of the head is determined responsive to a predetermined level of applied power and at a present disk drive operating temperature (at Block 725). For example, the disk drive may include an air temperature sensor in the head disk assembly that may measure the present disk drive operating temperature corresponding to the determined actuation efficiency. The determined actuation efficiency is compared with the expected actuation efficiency at the present disk drive operating temperature or a substantially similar temperature (at Block 730) as determined from the calculated expected actuation efficiency vs. temperature relationship. Burnishing of the air bearing surface of the head is detected (at Block 735) if a difference between the determined actuation efficiency and the expected actuation efficiency exceeds a predetermined threshold (for example, a difference of more than about 10%). Thus, according to some embodiments, changes in actuation efficiency of a head relative to an expected actuation efficiency may be used to detect damage to the head.

In the drawings and specification, there have been disclosed typical preferred embodiments and, although specific terms are employed, they are used in a generic and descriptive sense only and not for purposes of limitation, the scope being set forth in the following claims.

That which is claimed:

1. A method comprising:
    determining an actuation efficiency for a head based on a displacement of the head relative to a storage media responsive to excitation of a heater element; and
    detecting damage to the head based on the determined actuation efficiency.

2. The method of claim 1, wherein detecting damage to the head based on the actuation efficiency comprises:
    detecting changes to an air bearing of the head based on the determined actuation efficiency and an expected actuation efficiency for the head.

3. The method of claim 1, wherein detecting damage to the head comprises:
    comparing the determined actuation efficiency to an expected actuation efficiency for the head; and
    detecting burnishing of an air bearing surface of the head when a difference between the determined actuation efficiency and the expected actuation efficiency exceeds a predetermined threshold.

4. The method of claim 3, wherein detecting damage to the head further comprises:
    determining the expected actuation efficiency based on an amount of displacement of the head that is expected to occur when the heater element is supplied with a substantially similar amount of power as supplied in determining the actuation efficiency.

5. The method of claim 1, wherein detecting damage to the head further comprises:
    measuring an air temperature corresponding to the determined actuation efficiency; and
    determining an expected actuation efficiency for the head at a substantially similar temperature as the air temperature.

6. The method of claim 1, wherein determining the actuation efficiency comprises:
    positioning the head on a track on a disk surface; and
    measuring an amount of displacement of the head responsive to an amount of power applied to the heater element to determine the actuation efficiency without contact between the head and the disk surface.

7. The method of claim 6, wherein measuring the amount of displacement of the head comprises:

reading data from the track, wherein the track includes a bit pattern for measuring spacing between the head and the disk surface; and measuring the amount of displacement of the head based on changes in read signal amplitude.

8. The method of claim 1, further comprising:

storing head damage data in a data storage device responsive to detecting the damage to the head based on the determined actuation efficiency.

9. The method of claim 1, further comprising:

dynamically adjusting an amount of power applied to the heater element responsive to detecting the damage to the head based on the determined actuation efficiency.

10. The method of claim 1, further comprising:

determining respective actuation efficiencies for a plurality of heads based on respective head displacements relative to a storage media responsive to excitation of respective heater elements; and separately detecting damage to at least one of the plurality of heads based on the corresponding determined actuation efficiency.

11. The method of claim 1, wherein determining the actuation efficiency comprises:

determining the actuation efficiency responsive to detecting a read and/or write error rate that is greater than a predetermined threshold.

12. A circuit, comprising:

an actuation efficiency estimator that determines an actuation efficiency for a head based on a displacement of the head relative to a storage media responsive to excitation of a heater element; and a head damage detector that detects damage to the head based on the determined actuation efficiency.

13. The circuit of claim 12, wherein:

the head damage detector detects changes to an air bearing of the head based on the determined actuation efficiency and an expected actuation efficiency for the head.

14. The circuit of claim 13, wherein the head damage detector compares the determined actuation efficiency to the expected actuation efficiency and detects burnishing of an air bearing surface of the head when a difference between the determined actuation efficiency and the expected actuation efficiency exceeds a predetermined threshold.

15. The circuit of claim 13, wherein the head damage detector dynamically adjusts an amount of power applied to the heater element responsive to detection of the damage to the head.

16. The circuit of claim 12, wherein the controller comprises:

a servo controller that positions the head on a predetermined track on a disk surface, and the actuation efficiency estimator that measures an amount of displacement of the head relative to the predetermined track responsive to an amount of power applied to the heater element to determine the actuation efficiency without contact between the head and the disk surface.

17. The circuit of claim 16, wherein the head reads data from the track, wherein the track includes a bit pattern for measuring spacing between the head and the disk surface, and wherein the actuation efficiency estimator determines the amount of displacement of the head based on changes in read signal amplitude.

18. The circuit of claim 16, wherein the actuation efficiency estimator determines an expected actuation efficiency for the head based on an amount of displacement of the head that is expected to occur when the heater element is supplied with a substantially similar amount of power as that of the actuation efficiency.

19. The circuit of claim 16, wherein the actuation efficiency estimator determines the actuation efficiency responsive to detection of a read and/or write error rate that is greater than a predetermined threshold.

20. A disk drive, comprising:

a rotatable data storage disk;

a head that is adjacent to the rotatable storage disk; and a controller that determines an actuation efficiency for the head based on a displacement of the head toward a surface of the disk adjacent thereto responsive to excitation of a heater element and detects damage to the head based on the determined actuation efficiency.

* * * * *

UNITED STATES PATENT AND TRADEMARK OFFICE
CERTIFICATE OF CORRECTION

PATENT NO. : 7,652,840 B2  Page 1 of 1
APPLICATION NO. : 11/745691
DATED : January 26, 2010
INVENTOR(S) : Henry et al.

It is certified that error appears in the above-identified patent and that said Letters Patent is hereby corrected as shown below:

Column 14,
Line 11, delete "that".

Signed and Sealed this

Eleventh Day of May, 2010

David J. Kappos
*Director of the United States Patent and Trademark Office*